US012511196B2

(12) United States Patent
Feng et al.

(10) Patent No.: US 12,511,196 B2
(45) Date of Patent: Dec. 30, 2025

(54) COMPONENT FIRMWARE REPLACEMENTS VIA NETWORKS

(71) Applicant: Hewlett-Packard Development Company, L.P., Spring, TX (US)

(72) Inventors: Kang-Ning Feng, Taipei (TW); Ming-Chang Hung, Taipei (TW); Wei-Chih Huang, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 36 days.

(21) Appl. No.: 18/569,911

(22) PCT Filed: Jun. 18, 2021

(86) PCT No.: PCT/US2021/038011
§ 371 (c)(1),
(2) Date: Dec. 13, 2023

(87) PCT Pub. No.: WO2022/265652
PCT Pub. Date: Dec. 22, 2022

(65) Prior Publication Data
US 2024/0289223 A1 Aug. 29, 2024

(51) Int. Cl.
*G06F 11/14* (2006.01)
*G06F 11/07* (2006.01)

(52) U.S. Cl.
CPC ...... *G06F 11/1417* (2013.01); *G06F 11/0709* (2013.01); *G06F 11/0793* (2013.01)

(58) Field of Classification Search
CPC ............ G06F 11/0709; G06F 11/0736; G06F 11/0793; G06F 11/1417; G06F 11/142;
(Continued)

(56) References Cited

U.S. PATENT DOCUMENTS 12,210,861 B2 * 1/2025 Goel ...................... G06F 9/5005
2004/0103347 A1 5/2004 Sneed et al.
(Continued)

FOREIGN PATENT DOCUMENTS

CN 113064637 A * 7/2021 ............. G06F 8/654
EP 2817725 B1 * 2/2020 ............... G06F 8/63

*Primary Examiner* — Joseph O Schell
(74) *Attorney, Agent, or Firm* — Quarles & Brady LLP (57) ABSTRACT

An example non-transitory machine-readable medium includes recovery instructions that, when executed by a processor, cause the processor to detect a corruption of first installed instructions of first component firmware at a computing device and second installed instructions of second component firmware at the computing device. In response to detection of the corruption during pre-boot, if the first installed instructions are detected as corrupt, the recovery instructions request and receive first replacement instructions from a first network address, and replace in the computing device the first installed instructions with the first replacement instructions. If the second installed instructions are detected as corrupt, the recovery instructions request and receive second replacement instructions from a second network address different from the first network address, and replace in the computing device the second installed instructions with the second replacement instructions.

20 Claims, 7 Drawing Sheets (58) Field of Classification Search
CPC ............ G06F 11/1446; G06F 11/1469; G06F 11/2284; G06F 9/4401; G06F 9/4406
See application file for complete search history.

(56) References Cited

U.S. PATENT DOCUMENTS

| | | | |
|---|---|---|---|
| 2005/0229173 A1* | 10/2005 | Mihm | G06F 8/65 717/171 |
| 2007/0204144 A1* | 8/2007 | Gafken | G06F 8/65 713/2 |
| 2007/0294575 A1* | 12/2007 | Aichelen | G06F 11/1461 714/13 |
| 2009/0276612 A1* | 11/2009 | Holdaway | G06F 11/2025 713/1 |
| 2013/0125107 A1 | 5/2013 | Bandakka et al. | |
| 2016/0098561 A1 | 4/2016 | Keller et al. | |
| 2016/0373944 A1 | 12/2016 | Jain et al. | |
| 2017/0242836 A1* | 8/2017 | Marez | H04L 67/1097 |
| 2018/0287996 A1 | 10/2018 | Tripathy et al. | |
| 2020/0348946 A1 | 11/2020 | Pant et al. | |
| 2021/0240589 A1* | 8/2021 | Samuel | G06F 8/65 |

\* cited by examiner

COMPONENT FIRMWARE REPLACEMENTS VIA NETWORKS

BACKGROUND

Computing devices include firmware to implement functions related to hardware components. It is often the case that a computing device is constructed from hardware components provided by a number of different manufacturers or vendors. Such parties may also provide component firmware to accompany the provided hardware.

DETAILED DESCRIPTION

Component firmware may become corrupted, which may lead to decreased performance of a computing device, data loss, crash, or other significant malfunction.

Replacing component firmware is often a task for the end user or a service technician. It is often the case that a person manually downloads and installs new component firmware to replace a corrupted version.

Backup copies of component firmware may be stored on a computing device to act as replacement if corruption occurs. However, this takes storage space and such backup copies may become stale if not updated frequently.

Other approaches rely on an operating system (OS) of the computing device to detect and replace corrupted component firmware. However, this requires the OS to launch and severe component firmware corruption may prevent that. In addition, OS-based firmware recovery is OS-specific and may need to be implemented for different operating systems and versions thereof.

As such, as discussed herein, if component firmware becomes corrupted, then a mapping of component firmware may be referenced and a replacement for corrupted component firmware may be downloaded from a remote source, such as a hardware component manufacturer's server, a centrally managed server, or similar source. The mapping may be maintained remote from the computer by the manufacturer or provider of the computer. The mapping may represent a best known configuration (BKC) for elements of component firmware of the computer and may differ for different models of computer, versions of component firmware, version of Basic Input/Output System (BIOS), etc. The mapping may be maintained at a recovery server, so that the BKC for various computing devices may be kept current and consolidated at one location.

A BIOS may carry out the detection and replacement of a corrupted component firmware. Detection and replacement may be performed during pre-boot of the computing device. As such, the OS need not participate in component firmware recovery. This may increase efficiency and speed recovery by avoiding launching the OS until recovery has been completed.

Figure 1:
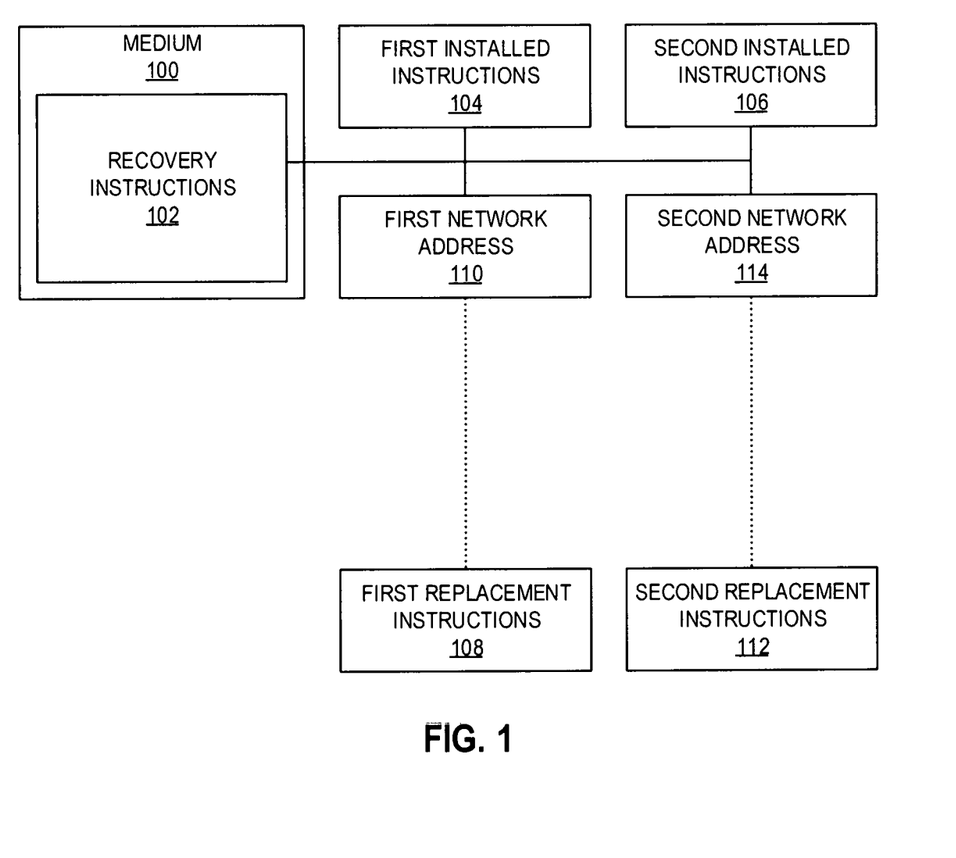
FIG. 1 is a block diagram of an example non-transitory machine-readable medium with component-firmware recovery instructions that detect a corrupted component firmware and obtain and install a replacement from a network address.

FIG. 1 shows an example non-transitory machine-readable medium 100 with component-firmware recovery instructions 102 that detect a corrupted component firmware and obtain and install a replacement from a network address.

The non-transitory machine-readable medium 100 may be part of a computing device, such as a desktop computer, notebook computer, all-in-one (AIO) computer, server, or similar device.

The non-transitory machine-readable medium 100 may include a non-volatile memory, such as a read-only memory (ROM), electrically-erasable programmable read-only memory (EEPROM), or flash memory that cooperates with a processor, such as a central processing unit (CPU) of a computing device, to execute the instructions. The non-transitory machine-readable medium 100 may include an electronic, magnetic, optical, or other physical storage device that encodes the instructions 102 that implement the functionality discussed herein.

The recovery instructions 102 may be directly executed, such as binary or machine code, and/or may include interpretable code, bytecode, source code, or similar instructions that may undergo additional processing to be executed. All of such examples may be considered executable instructions.

The recovery instructions 102 detect the corruption of instructions of installed component firmware. Multiple sets of instructions may be installed at a computing device in non-volatile memory to implement multiple different component firmware that support different hardware components of the computing device. In various examples, each element of component firmware supports a hardware component, and each component firmware may be supplied by the manufacturer or supplier of the hardware component. Examples of hardware components include a serial bus controller, such as a Universal Serial Bus (USB™) controller or Thunderbolt™ controller, USB Power Delivery (PD) controller, camera, memory card reader, fingerprint reader, audio card, graphics card, storage device, and similar hardware devices. Component firmware may be provided on a non-transitory machine-readable medium, such as a non-volatile memory chip, carried by the hardware component. In some examples, component firmware may include initialization code and/or a driver for the hardware component.

Detection of corruption may be performed by the recovery instructions 102 receiving a signal, such as a hardware interrupt, from a hardware device. A hardware component may issue a signal to the processor to indicate an error, which may be the result of component firmware corruption. An interrupt, hardware vendor-provided protocol, or other signal may be available to the processor and thus to the instructions 102 by way of a status register, for example. The instructions 102 being executed by the processor may identify the signal as indicating firmware corruption. In other examples, the instructions 102 may compute a hash, cyclic redundancy check (CRC), or other value of the firmware, and then check such value against an accepted value to determine whether or not the component firmware has been corrupted.

In this example, first installed instructions 104 are provided for a first component firmware and second installed instructions 106 are provided for a second component firmware. The instructions 104, 106 are designated as installed in that they are installed at the computing device to support the associated hardware components. The first installed instructions 104 provide a first functionality to the computing device, such as initializing and/or providing a driver for a hardware component. The second installed instructions 106 provide a different, second functionality, such as initializing and/or providing a driver for a different hardware component. Any number of sets of instructions 104, 106 may be provided to support any suitable number of hardware components, with two being discussed here merely for sake of brevity.

The recovery instructions 102 detect for corruption of the first and second installed instructions 104, 106. Detection of the corruption may inherently identify the cause of the corruption. For example, a hardware interrupt may identify the hardware component and thus the firmware.

If the first installed instructions 104 are detected as corrupt, the recovery instructions 102 request first replacement instructions 108 from a first network address 110. A computing device at the first network address 110 responds with the first replacement instructions 108, which are received by the computing device. The recovery instructions 102 then replace the first installed instructions 104 with the received first replacement instructions 108. After installation, the first replacement instructions 108 become the new first installed instructions to carry out the functionality of the first component firmware.

Likewise, if the second installed instructions 106 are detected as corrupt, the recovery instructions 102 request second replacement instructions 112 from a second network address 114. A computing device at the second network address 114 responds with the second replacement instructions 112, which are received by the computing device. The recovery instructions 102 then replace the second installed instructions 106 with the received second replacement instructions 112. After installation, the second replacement instructions 112 become the new second installed instructions to carry out the functionality of the second component firmware.

The recovery instructions 102 may include instructions to initiate and operate a network interface of the computing device, so as to allow access to the network addresses 110, 114 to obtain respective replacement instructions 108, 112 for any corrupt component firmware.

The network addresses 110, 114 may be stored in a mapping that is accessible by the recovery instructions 102 and that associates component firmware with network addresses. Component firmware may be uniquely identified by hardware device type, hardware device type provider/manufacturer, component firmware version, model of computing device, BIOS version, and similar information. The mapping may define best known configurations of component firmware for various combinations of such information. The mapping may be stored at the computing device, such as in the medium 100, or may be stored remotely.

The instructions 102 may form part of a BIOS that may initialize, control, or operate a computing device that contains the medium 100 prior to execution of an OS of the computing device. Instructions included within the BIOS may include software, firmware, microcode, or other programming that defines or controls functionality or operation of the BIOS. In some examples, the BIOS may be implemented using instructions, such as platform firmware of a computing device, executable by a processor, such as a central processing unit (CPU) of the computing device. The BIOS may operate or execute prior to the execution of the OS of the computing device. The BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

The instructions 102 may be executed during pre-boot of the computing device, such as during a driver execution environment (DXE) phase of a UEFI boot sequence. Hence, corruption of component firmware may be detected before OS launch. In various examples, after the replacement component firmware, the instructions 102 may reset the computing device and replace the component firmware on the subsequent pre-boot. The OS may then be subsequently launched without the corrupted component firmware. As such, the OS may be excluded from recovery of corrupted component firmware, which may reduce the time required to recover in that the time required to launch the OS is not expended. Resetting the computing device also allows the instructions 102 to verify that the replacement component firmware is not corrupt by predicting an additional cycle of corruption detection.

Figure 2:
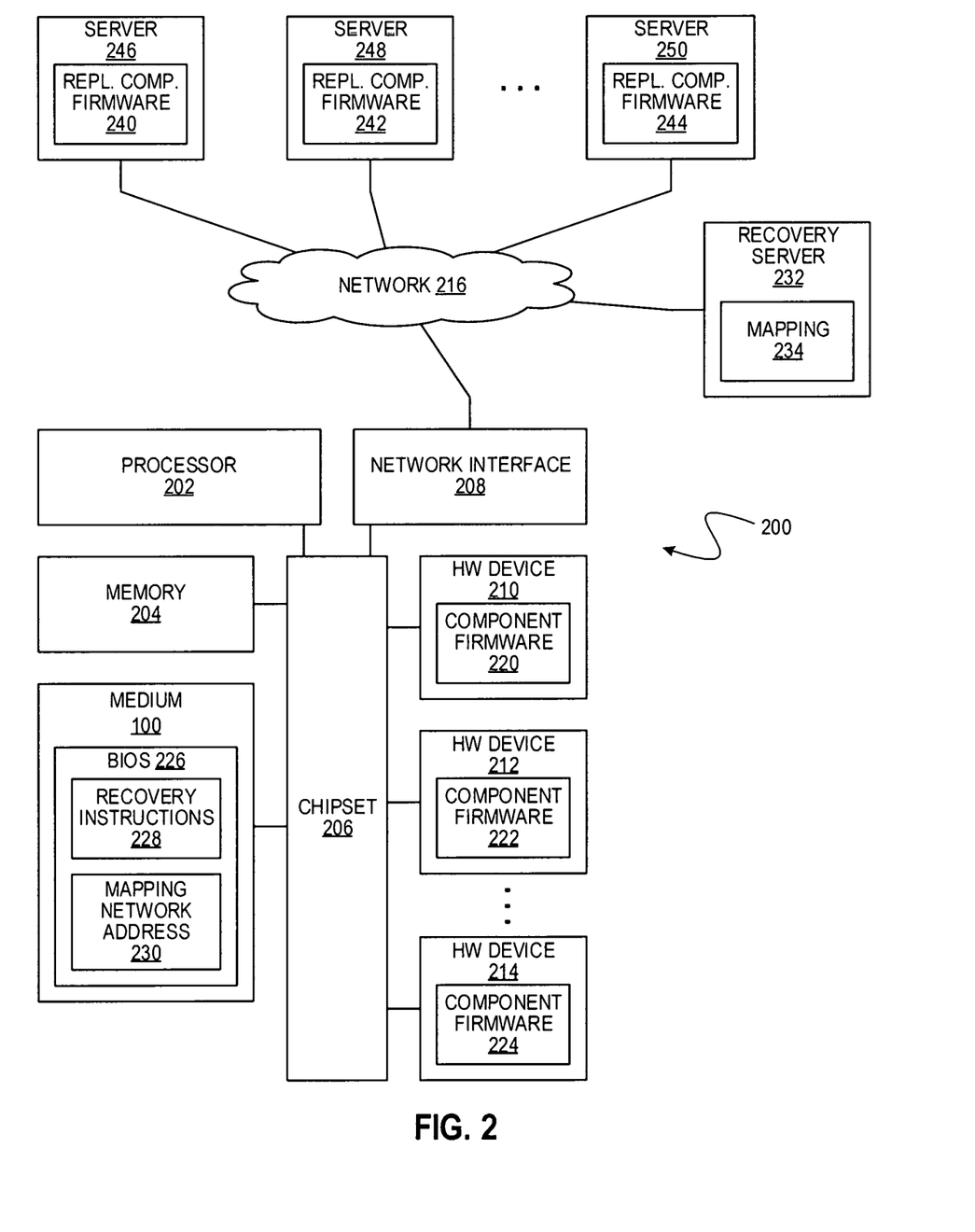
FIG. 2 is a block diagram of an example computing device that references a mapping to obtain and install a replacement for a corrupted component firmware.

FIG. 2 is a block diagram of an example computing device 200 that references a mapping to obtain and install a replacement for a corrupted component firmware.

The computing device 200 includes a processor 202, memory 204, a non-transitory machine-readable medium 100, a chipset 206, a network interface 208, and a plurality of hardware devices 210, 212, 214.

The processor 202 may include a central processing unit (CPU), a field-programmable gate array (FPGA), an application-specific integrated circuit (ASIC), or a similar device capable of executing instructions.

The memory 204 may include random-access memory (RAM) or similar working memory for use by the processor 202.

The chipset 206 may include an integrated circuit or circuits that connect and manage data flow among the processor 202, memory 204, medium 100, chipset 206, network interface 208, and hardware devices 210, 212, 214.

The network interface 208 may include hardware, such as a network adaptor card, network interface controller, or network-capable chipset, and may further include instructions, such firmware. The network interface 208 allows data to be communicated between the computing device 200 and a computer network 216, such as a local-area network (LAN), wide-area network (WAN), virtual private network (VPN), the internet, or similar networks that may include wired and/or wireless pathways.

The hardware devices 210, 212, 214 include respective component firmware 220, 222, 224. Examples of hardware devices 210, 212, 214 include USB controllers, cameras, memory card readers, and so on, as discussed elsewhere herein. Each component firmware 220, 222, 224 includes instructions to initialize and/or provide a driver for the respective hardware devices 210, 212, 214.

The medium 100 may store a BIOS 226 for execution by the processor 202. The BIOS 226 may include component-firmware recovery instructions 228, which may include functionality discussed above with respect to the instructions 102. The BIOS 226 may further include a mapping network address 230 that identifies a recovery server 232 that hosts a mapping 234 that associates replacement component firmware with network addresses. The mapping 234 may be maintained remotely from the computing device 200 and the recovery instructions 228 may query the mapping 234 via a network 216.

The recovery server 232 may be a computing device that hosts the mapping 234 at a Uniform Resource Locator (URL) that identifies a protocol or scheme, domain, and path of the mapping 234. The mapping 234 may be a data file, a directory of files, a database responsive to queries, or similar data structure that can store and provide information.

The mapping network address 230 is the address of the mapping 234 as available on the network 216 and, as such, may be a URL expression. The mapping network address 230 may identify a file structure or a database that provides network addresses of replacement component firmware 240, 242, 244 made available via the network 216 on component-firmware servers 236, 238, 240. The mapping network address 230 may be configurable by the manufacturer or provider of the computing device 200 or by the user of the computing device 200.

In some examples, information that uniquely identifies each component firmware is arranged in a directory structure, such that a mapping network address 230 conforming to the following structure uniquely identifies a file:

https://www.example.com/model/BIOSversio/hw/FW-version/ where "model" is replaced with a model identifier of the computing device (e.g., Notebook_Model_1), "BIOSversion" is replaced with a version identifier of the BIOS (e.g., 00.01.00), "hw" is replaced with a hardware identifier (e.g., Camera_A), and "FWversion" is replaced with a version identifier of the component firmware of the hardware (e.g., 1.02).

As such, the following specific mapping network address 230 may be a directory that contains a file that contains a network address of the respective replacement component firmware:

https://www.example.com/Notebook_Mode_1/00.01.00/Camera_A/1.02/

The file at this location may contain the network address of the requested replacement component firmware 240, 242, 244, for example:

https://www.example1.com/Camera_A_1-02.dat

This file at the above network address may be the replacement component firmware 240, 242, 244 itself.

In other examples, the mapping network address 230 may identify a database that responds to a parameterized query, such as:

https://www.example.com/?model=Notebook_Model_1&BIOSversion=00.01.00&hw=Camera_A&FWversion=1.02

Such a query may be parsed and executed by the recovery server 224 against a database that contains a table of network addresses of replacement component firmware 240, 242, 244.

Hence, a structured request made with the mapping network address 230 returns a network address of the replacement component firmware 240, 242, 244. The recovery server 232 thus acts as a central directory of replacement component firmware 240, 242, 244 that may be stored on component-firmware servers 246, 248, 250.

The recovery server 232 may be managed by an organization that makes, sells, or services the computing device 200. The component-firmware servers 246, 248, 250 may be managed by organizations that make, sell, or service the hardware devices 210, 212, 214. As such, the servers 232, 246, 248, 250 may be in separate domains and may be operated independently of each other. Any suitable number of recovers servers 232 and component-firmware servers 246, 248, 250 may be used.

The recovery instructions 228 may monitor and detect corruption of component firmware 220, 222, 224 installed at the computing device 200. In response to detection of corruption, the instructions 228 identify the component firmware that is corrupt for example, by hardware name/type and component firmware version, and then construct a query with the mapping network address 230 using information such as the model of the computing device 200 and version of the BIOS 226. The instructions may then address such query to the recovery server 232 via the network interface 208 and network 216.

The recovery server 232, in response to receiving from the computing device 200 the query indicating the corrupted component firmware, then determines a network address for the corresponding replacement component firmware 240, 242, 244 by referencing the mapping 234 of identifiers of component firmware 240, 242, 244 to network addresses. The recovery server 232 then transmits, via the network 216, an indication of the network address (e.g., a URL) to the computing device 200.

The recovery instructions 228 receive the indication of the network address and request the corresponding replacement component firmware 240, 242, 244 from the respective server 246, 248, 250. The recovery instructions 228 then download and install the replacement component firmware 240, 242, 244.

To install the replacement component firmware 240, 242, 244, the recovery instructions 228 may store the replacement component firmware 240, 242, 244 at the medium 100 and set a flag indicating that new replacement component firmware 240, 242, 244 is available. The instructions 228 may then reset the computing device 200. After the reset, during a subsequent pre-boot, the BIOS 226 detects the flag, thus detecting the presence of the replacement component firmware 240, 242, 244, and installs the replacement component firmware 240, 242, 244.

Figure 3:
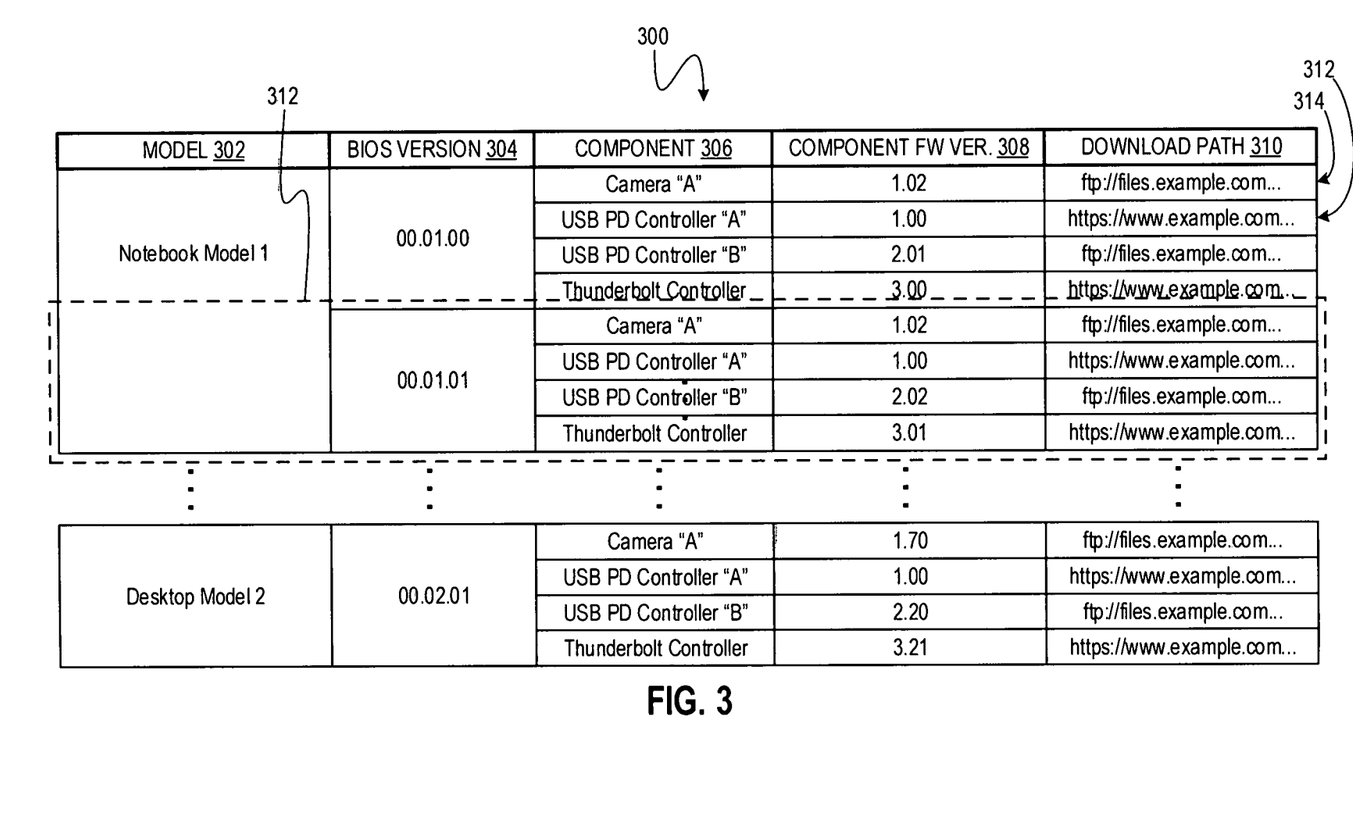
FIG. 3 is a table of an example mapping of component firmware identifiers to network addresses of replacement component firmware.

FIG. 3 shows an example mapping 300 of component firmware identifiers to network addresses of replacement component firmware. The mapping 300 is illustrated as a table for sake of understanding. The mapping 300 may be implemented as database table, directory structure, or similar data structure, as discussed elsewhere herein. The mapping 300 is an example of the other mappings discussed herein, such as mapping 234.

The mapping correlates various combinations of computing device model 302, BIOS version 304, hardware component/device 306, and component firmware version 308 to uniquely definable download paths 310. Each download path 310 identifies a component firmware which may be used to replace a corrupted component firmware.

For example, the mapping 300 associates first replacement instructions of a first component firmware, as identified by hardware component 306 and firmware version 308, with a first network address 312 stored as a particular download path 310. Similarly, the mapping 300 associates different, second replacement instructions of a second component firmware, as identified by hardware component 306 and firmware version 308, with a second network address 314 stored as another particular download path 310. The network addresses 312, 314 may be at separate domains and may operate according to different protocols, such as Hypertext Transfer Protocol (HTTP), HTTP Secure (HTTPS), and File Transfer Protocol (FTP).

The mapping 300 may be updated as new models 302 with new/different components 306 are released. The mapping 300 may be updated as new BIOS versions 304 and component firmware versions 308 are released. Older information may be maintained, so that older computing devices may be supported.

A given set of component firmware, as identified by respective download paths 310, may be considered a best known configuration for the corresponding BIOS version 304 and model 302. An example of a best known configuration is shown at dashed box 316.

Figure 4:
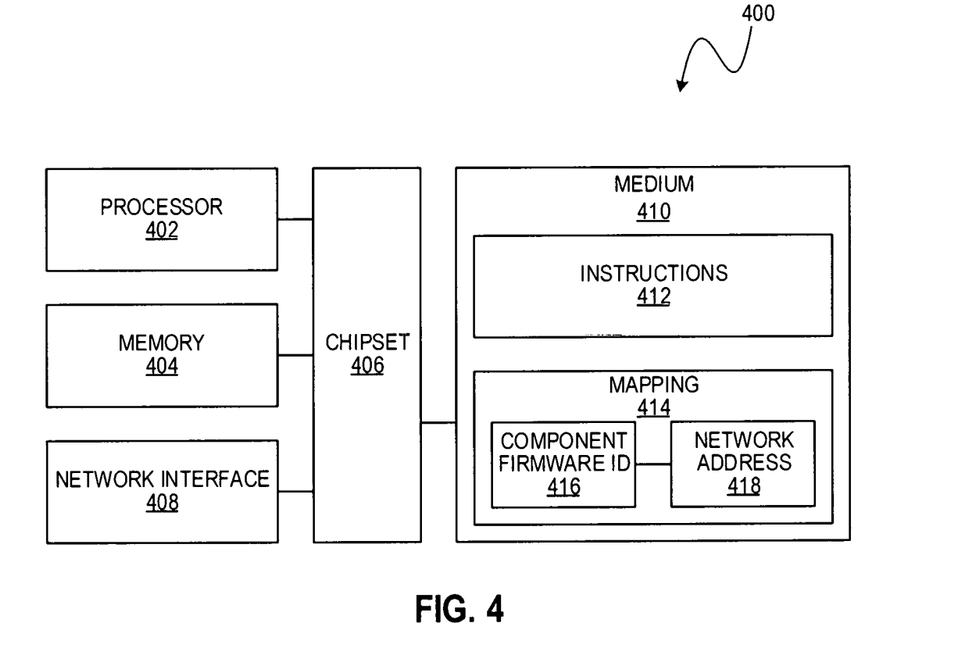
FIG. 4 is a block diagram of an example recovery server that provides network addresses of replacement component firmware in response to requests.

FIG. 4 shows an example recovery server 400 that provides network addresses of replacement component firmware in response to requests from computing devices, such as the computing device 200 of FIG. 2. The recovery server 400 may be used as the recovery server 232 of FIG. 2.

The recovery server 400 is a computing device that includes a processor 402, memory 404, chipset 406, network interface 408, and non-transitory machine-readable medium 410. Details of these components not repeated here may found elsewhere herein with regard to like-named components.

The medium 410 may store directing instructions 412 and a mapping 414.

The instructions 412 receive indications of corrupted component firmware from remote computing devices, via the network interface 408, and reference the mapping 414 to determine corresponding network addresses of replacement component firmware. The instructions 412 further transmit to the remote computing devices, via the network interface 408, indications of the network addresses.

The mapping 414 correlates identifiers of component firmware 416 to network addresses 418. As such, an indication of a corrupted component firmware received from a remote computing device may be used to obtain a network address 418 at which another server hosts the corresponding replacement component firmware indicated by the identifier 416.

A component firmware identifier 416 may include a version of the corrupted component firmware, a model of the remote computing device, and/or similar identifying data discussed elsewhere herein. Similar data may be received from a computing device requesting a network address 418 for a replacement component firmware.

The instructions 412 may further receive an indication of the network address 418 from a source of the replacement component firmware, such as a hardware manufacturer or vendor. Such indications may be provided by a form or other user interface element available to the source via a network. The instructions 412 may thus update the mapping 414 as new versions of component firmware are released or as storage locations of component firmware are changed.

The instructions 412 and mapping 414 may be implemented by a script and database, a directory structure, or similar technique.

Figure 5:
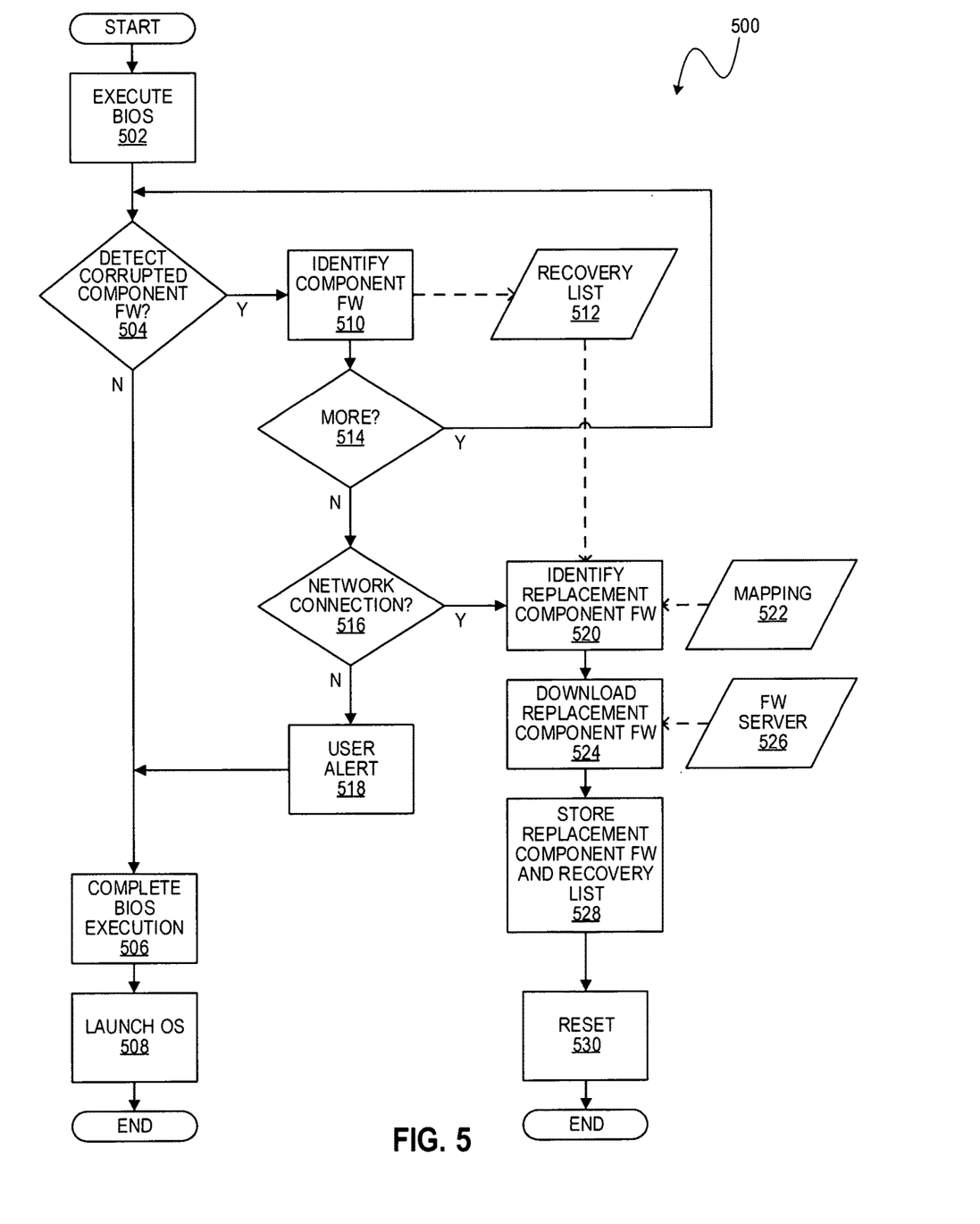
FIG. 5 is a flowchart of an example method of obtaining replacement component firmware for component firmware detected to be corrupted.

FIG. 5 shows an example method 500 of obtaining replacement component firmware for component firmware detected to be corrupted. The method 500 may be implemented as processor-executable instructions of a computing device, such as instructions of a BIOS.

At block 502, the BIOS is launched 502 and takes control of the computing device. Execution of the BIOS may include a Pre-EFI Initialization (PEI) phase and a DXE phase.

At block 504, the BIOS detects for corrupted component firmware by, for example, hardware interrupt, vendor-defined protocol, or similar signaling mechanism. This may occur during the DXE phase.

If no corrupted component firmware is identified, then the BIOS performs a boot device selection (BDS), at block 506, and completes its execution. The OS is then launched, at block 508. This concludes normal startup and the method 500 ends.

If a corrupted component firmware is detected, at block 510, the corrupted component firmware is identified by, for example, computing device model, hardware device identifier, component firmware version, and/or other data as discussed elsewhere herein. The identifying data may be added to a recovery list 512. The identifying data may also include an identifier or address of the respective hardware device for later reference when replacing component firmware.

Blocks 504 and 510 may be repeated for all component firmware of the computing device, via block 514, adding an identifier for any detected corrupted component firmware to the recovery list 512.

After all component firmware has been considered for corruption, such as by the BIOS reaching a specific point in execution, it is determined whether a network connection is available, at block 516.

If no network connection is available, the BIOS outputs a user alert, at block 518. An example user alert includes a dialog box or other user interface notification, to warn the user that a corrupted firmware component has been detected. The contents of the recovery list 512 may be displayed to the user. The BIOS then completes execution, at block 506.

If a network connection is available, replacement component firmware corresponding to the corrupted component firmware is identified, at block 520. This may include transmitting, via the network, an identifier to a server that hosts a mapping 522 of component firmware identifier to network address and receiving, in response, an indication of a specific network address for a specific identifier of the corrupted component firmware. This may be done for each element of corrupted component firmware on the recovery list 512.

Then, at block 524, replacement component firmware is downloaded from a component firmware server 526 identified by an obtained network address. This may be done for each network address obtained at block 520 for each item of corrupted component firmware. Different servers 526 may be accessed.

At block 528, the downloaded replacement component firmware is stored in non-volatile memory. The recovery list 512 may also be stored in non-volatile memory, so as to indicate to the BIOS during next execution which component firmware has replacement component firmware to be installed. Alternatively, a simple flag may be set in non-volatile memory to inform the BIOS to check a location of non-volatile memory reserved for replacement component firmware.

Then, at block 530, the BIOS triggers a reset of the computing device.

Figure 6:
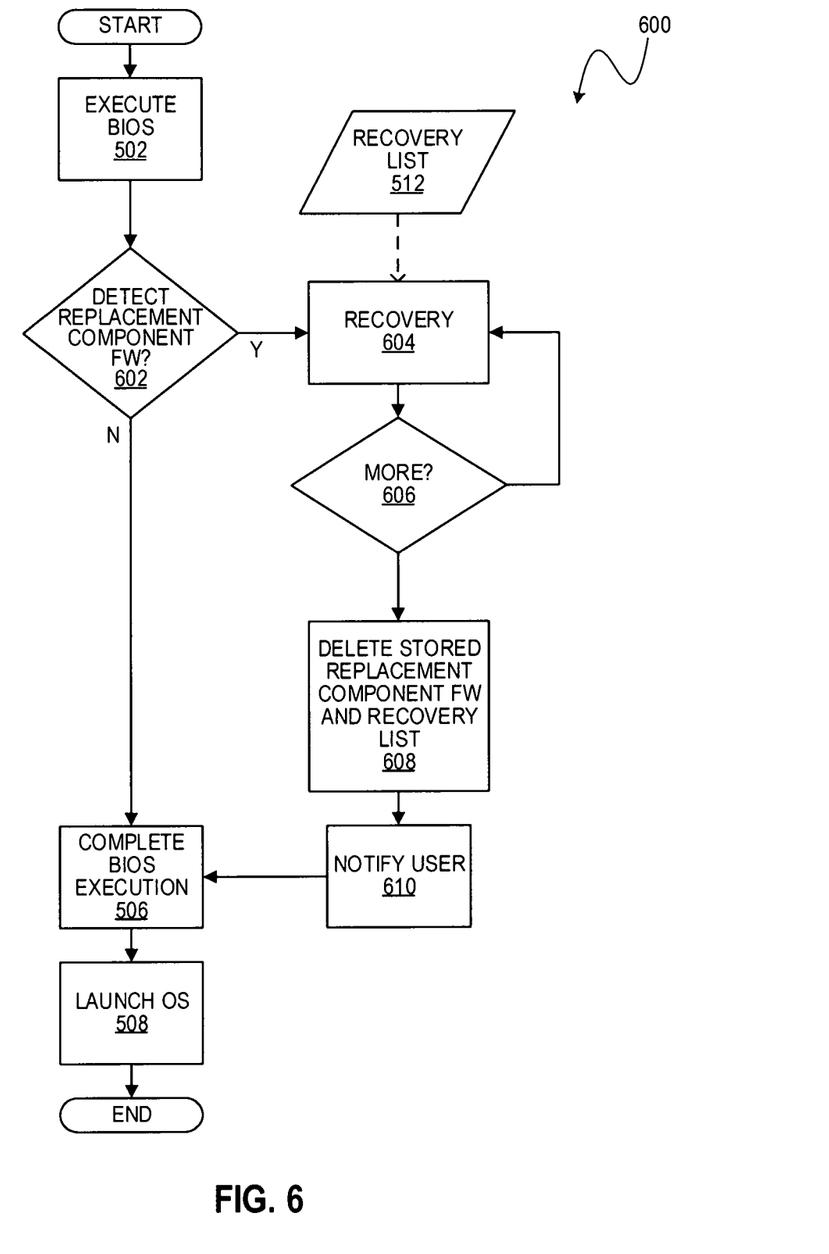
FIG. 6 is a flowchart of an example method of installing replacement component firmware to replace component firmware detected to be corrupted.

FIG. 6 shows an example method 600 of installing replacement component firmware to replace component firmware detected to be corrupted. The method 600 may be implemented as processor-executable instructions of a computing device, such as instructions of a BIOS.

At block 502, the BIOS is launched 502 and takes control of the computing device, as discussed with respect to the method 500.

At block 602, the presence of any replacement component firmware is detected. This may include checking for a recovery list 512 and/or replacement component firmware in non-volatile memory. Alternatively, a flag may be checked. If no replacement component firmware is found to be present, then BIOS execution completes and the OS is launched at blocks 506 and 508, as discussed with respect to the method 500.

If replacement component firmware is detected, then recovery is performed at block 604. Recovery may include copying replacement component firmware to non-volatile storage associated with the respective hardware device. Such storage may be part of the hardware device. The recovery list 512 may be referenced to identify the respective hardware device.

Recovery is performed for each element on the recovery list 512, via block 604.

After all elements of replacement component firmware have been installed, then the downloaded copy of the replacement component firmware is deleted from non-volatile memory. The recovery list 512 is also deleted. Alternatively, a flag may be cleared. This prevents superfluous detection at next execution of block 602.

Then, a user notification may be issued, at block 610. A dialog box or similar user interface element may be displayed to the user to inform the user of the recovery and the affected items of component firmware and/or underlying hardware devices. Then, BIOS execution completes and the OS is launched at blocks 506 and 508.

The method 500 of detecting and obtaining replacement component firmware and the method 600 of installing obtained replacement component firmware may be implemented together in a BIOS or other set of instructions of a computing device. In various examples, execution of the methods 500, 600 may be coordinated, so that corrupted component firmware is replaced by previously obtained replacement component firmware before detection is performed.

Figure 7:
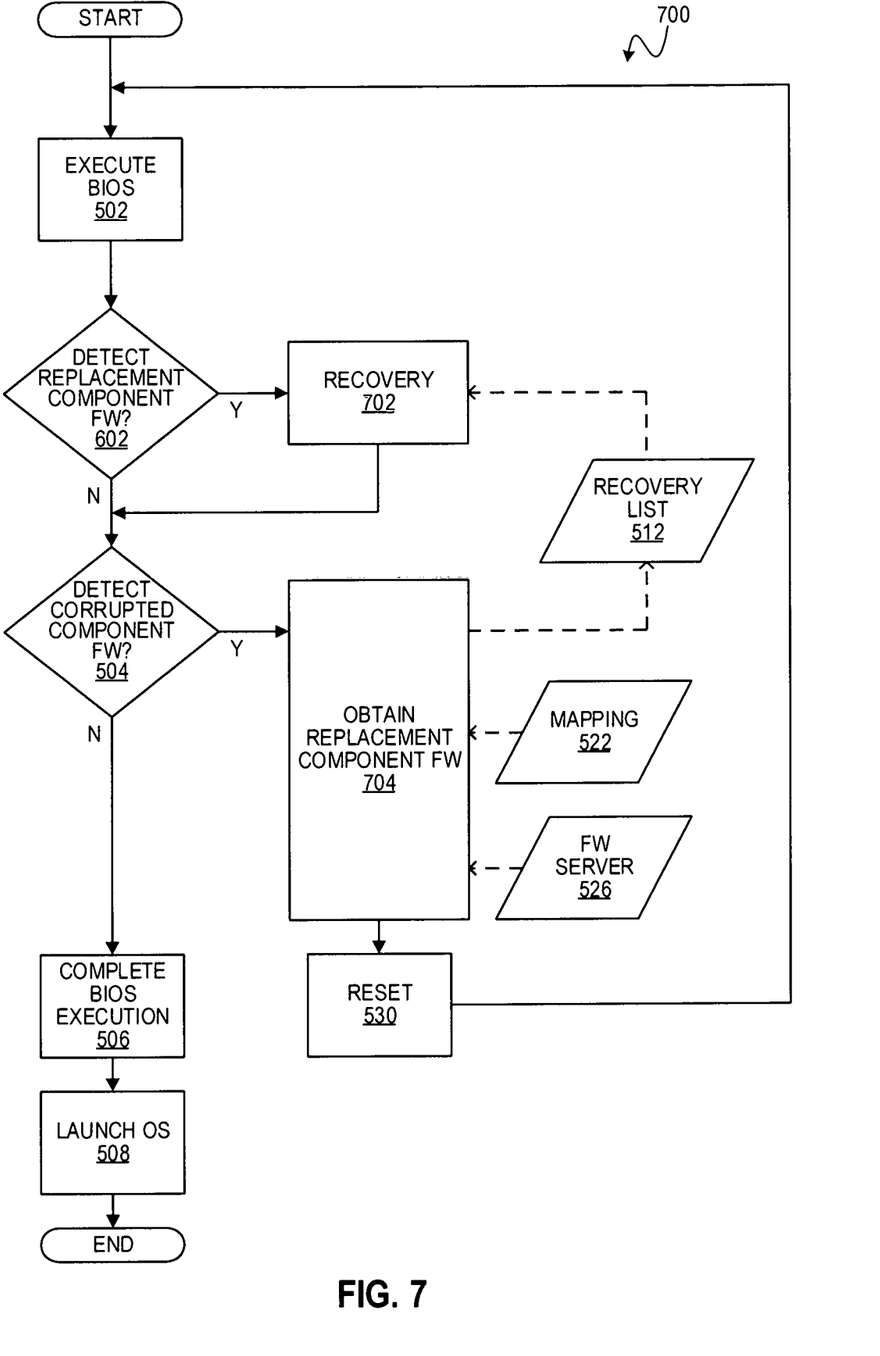
FIG. 7 is a flowchart of an example method of obtaining replacement component firmware for component firmware detected to be corrupted and installing the replacement component firmware.

FIG. 7 shows an example method of obtaining replacement component firmware for component firmware detected to be corrupted, and installing the replacement component firmware. The method 700 may be implemented as processor-executable instructions of a computing device, such as instructions of a BIOS. Discussion of details already explained is not repeated here, and the description above may be referenced for like-numbered blocks.

BIOS execution begins at block 502.

At block 602, when replacement component firmware is detected, recovery is performed, at block 702, with reference to a recovery list 512. Block 702 may implement blocks 604, 606, 608, and 610 discussed above.

Next, at block 504, when corrupted component firmware is detected, replacement component firmware is obtained from a server or servers 526 with reference to a mapping 522 of component firmware identifier to network address, at block 704. A recovery list 512 may be generated. Block 704 may implement blocks 510, 514, 516, 520, 524, and 528 discussed above.

Subsequent to block 704, the computing device is reset at block 530, so that the method 700 is repeated. During next execution of the method 700, block 602 detects replacement component firmware and recovery is performed. Further, it is likely that block 504 will not detect further corrupted component firmware, hence, the BIOS will complete execution and the OS will be launched at blocks 506 and 508. If block 504 does detect further corrupted component firmware, the method 700 may continue for another cycle of obtaining replacement component firmware and resetting the computing device. The number of cycles may be limited to prevent an infinite loop and a user alert may be issued if the limit is exceeded.

In view of the above, it should be apparent that corrupted component firmware may be recovered without user or OS intervention. User experience may be improved, in that the user need not manually recover corrupted component firmware themselves, contact a service technician, or wait for the OS to launch to correct corrupted component firmware. Moreover, a specific OS that supports OS-based recovery need not be installed. Other operating systems including cloud-based operating systems are compatible with the techniques discussed herein. In addition, non-volatile storage space at the computing device may be saved by avoiding storing backup copies of component firmware locally. Further, the centralization of the mapping and distributed sources of replacement component firmware is highly scalable and relatively simple to keep updated, so that BKCs for numerous different configurations of computing devices may be readily maintained.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A non-transitory machine-readable medium comprising recovery instructions that, when executed by a processor, cause the processor to:
   during a pre-boot of a computing device, detect a corruption of at least one of first installed instructions of a first component firmware at the computing device or second installed instructions of a second component firmware at the computing device;
   during the pre-boot:
      in response to detection of the corruption of the first installed instructions, request and receive first replacement instructions from a first network address, and replace in the computing device the first installed instructions with the first replacement instructions; and
      in response to detecting of the corruption of the second installed instructions, request and receive second replacement instructions from a second network address different from the first network address, and replace in the computing device the second installed instructions with the second replacement instructions; and
   query a mapping that is maintained remotely and associates the first replacement instructions with the first network address.

2. The non-transitory machine-readable medium of claim 1, wherein the mapping associates the second replacement instructions with the second network address.

3. The non-transitory machine-readable medium of claim 2, wherein the recovery instructions are to query the mapping via a network.

4. The non-transitory machine-readable medium of claim 2, wherein the mapping stores best known configurations (BKCs) of component firmware of different computing devices.

5. The non-transitory machine-readable medium of claim 1, wherein the first installed instructions and first replacement instructions provide a first functionality to the computing device that is different from a second functionality provided by the second installed instructions and second replacement instructions.

6. The non-transitory machine-readable medium of claim 1, wherein the first network address is in a first domain and the second network address is in a second domain that is separate from the first domain.

7. The non-transitory machine-readable medium of claim 1, wherein the first network address is accessible by a first protocol and the second network address is accessible by a second protocol that is different from the first protocol.

8. The non-transitory machine-readable medium of claim 1, wherein the instructions are further to:
   if the first installed instructions are detected as corrupt, trigger a reset of the computing device after receiving the first replacement instructions from the first network address and before replacing in the computing device the first installed instructions with the first replacement instructions; and
   if the second installed instructions are detected as corrupt, trigger the reset of the computing device after receiving the second replacement instructions from the second network address and before replacing in the computing device the second installed instructions with the second replacement instructions.

9. The non-transitory machine-readable medium of claim 1, wherein the instructions are further to:
   if the first installed instructions are detected as corrupt, launch an operating system of the computing device after replacing in the computing device the first installed instructions with the first replacement instructions; and
   if the second installed instructions are detected as corrupt, launch the operating system of the computing device after replacing in the computing device the second installed instructions with the second replacement instructions.

10. A non-transitory machine-readable medium comprising instructions that, when executed by a processor, cause the processor to:
    monitor a pre-boot of a computing device to detect corruption of component firmware; and
    in response to detection of the corruption and during the pre-boot:
      identify the component firmware that has the corruption;
      query a remotely maintained mapping that associates replacement component firmware with network addresses to obtain a network address;
      request and receive replacement component firmware for the corrupted component firmware from the network address; and
      replace in the computing device the corrupted component firmware with the replacement component firmware.

11. The non-transitory machine-readable medium of claim 10, wherein the instructions are further to launch an operating system of the computing device after replacing the corrupted component firmware with the replacement component firmware.

12. The non-transitory machine-readable medium of claim 10, wherein the instructions are further to:
    reset the computing device after receiving the replacement component firmware; and
    replace in the computing device the corrupted component firmware with the replacement component firmware after the reset.

13. The non-transitory machine-readable medium of claim 12, wherein the instructions are further to detect a presence of the replacement component firmware during boot and, in response, replace in the computing device the corrupted component firmware with the replacement component firmware.

14. The non-transitory machine-readable medium of claim 10, wherein the instructions are to query the remotely maintained mapping by transmitting an identifier to a server that hosts the remotely maintained mapping and receiving, in response, an indication of the network address corresponding to the identifier.

15. The non-transitory machine-readable medium of claim 10, wherein the instructions are further to, in response to determining that no network connection is available, output a user alert to indicate that the corruption has been detected.

16. A computing device comprising:
    a network interface;
    a processor connected to the network interface, the processor to:
      receive from a remote computing device via the network interface an indication of a corrupted component firmware detected during pre-boot of the remote computing device;
      determine a network address for a replacement component firmware by referencing a mapping of identifiers of component firmware to network addresses; and
      transmit to the remote computing device via the network interface an indication of the network address.

17. The computing device of claim 16, wherein the processor is further to:
    determine the network address for the replacement component firmware based on a version of the corrupted component firmware.

18. The computing device of claim 16, wherein the processor is further to:
    receive from the remote computing device an identifier of a model of the remote computing device; and
    determine the network address for the replacement component firmware based on the model of the remote computing device.

19. The computing device of claim 16, wherein the processor is further to receive an indication of the network address from a source of the replacement component firmware.

20. The computing device of claim 16, wherein the mapping represents a best known configuration (BKC) for elements of the component firmware.

* * * * *